(12) United States Patent
Chou et al.

(10) Patent No.: US 6,416,239 B1
(45) Date of Patent: Jul. 9, 2002

(54) CAMERA POSITIONING SEAT

(75) Inventors: Tai Wen Chou; Yu Chu Tang; Beniamin Lai, all of Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 09/696,268

(22) Filed: Oct. 26, 2000

(51) Int. Cl.[7] .................. G03B 17/00; H04N 5/225; H04N 7/14
(52) U.S. Cl. .............. 396/419; 248/187.1; 348/143; 348/373
(58) Field of Search .................. 396/419, 422, 396/425, 428, 429; 248/187.1; 348/373, 375, 14.01, 14.08, 14.16

(56) References Cited

U.S. PATENT DOCUMENTS

| | | | | |
|---|---|---|---|---|
| 5,612,733 A | * | 3/1997 | Flohr | 348/14.16 |
| 5,649,256 A | * | 7/1997 | Wen | 396/427 |
| 5,734,414 A | * | 3/1998 | Nishimura et al. | 348/14.05 |
| 5,880,783 A | * | 3/1999 | Ma | 348/373 |
| 5,900,907 A | * | 5/1999 | Malloy et al. | 348/14.1 |
| 5,921,523 A | * | 7/1999 | South et al. | 396/419 |
| 6,137,526 A | * | 10/2000 | Kakii | 348/14.08 |
| 6,141,052 A | * | 10/2000 | Fukumitsu et al. | 348/14.08 |
| 6,229,569 B1 | * | 5/2001 | Saito et al. | 348/270 |
| 6,300,979 B1 | * | 10/2001 | Parkinson et al. | 248/187.1 |
| 6,323,902 B1 | * | 11/2001 | Ishikawa | 248/918 |

* cited by examiner

Primary Examiner—Alan A. Mathews
(74) Attorney, Agent, or Firm—Rosenberg, Klein & Lee

(57) ABSTRACT

A camera positioning seat includes a connecting device, an hook, and a position device. The connecting device has a connecting piece. One surface of the connecting piece has an embedding piece, a rear surface of the camera is installed with a buckling groove with respect to a position of the embedding piece. An elastic hook is installed at one lateral side of another surface of the connecting piece. The position device has a fixing box, and a sticky object is installed at one surface of the fixing box. Thereby, when the camera is to be fixed to the display device, the embedding piece of the connecting piece is embedded into the buckling groove at the rear side of the camera, and then the hook at another surface of the connecting device is hooked to the fixing box. Afterwards, by the sticky object of the fixing box is fixed to the display device and thus, the camera is fixed to the display device. The structure of the positioning seat has a simple structure and can be assembled and detached convenient. Moreover, the engaging direction of the positioning seat can be changed as desired so as to change the arrangement of the camera

6 Claims, 7 Drawing Sheets

CAMERA POSITIONING SEAT

FIELD OF THE INVENTION

The present invention relates to a camera positioning seat for capturing an image and then displaying the image on a display device. By a positioning seat engaged with the camera, the camera can be fixed to the display device. No collision occurs. The structure of the positioning seat has a simple structure and can be assembled and detached convenient. Moreover, the engaging direction of the positioning seat 10 can be changed as desired so as to change the arrangement of the camera.

BACKGROUND OF THE INVENTION

As those disclosed in Taiwan Patent Nos. 87309468, 87305922, 86210124, 85220368, etc. each camera has a casing. A circuit unit formed by a plurality of electronic elements is installed within the casing. A lens is installed on the circuit unit. The image capturing portion of the lens is correspondent to an opening at the front side of the casing for capturing the outer image. A seat is installed at the bottom of the casing. Therefore, the camera can be placed on the display device of for example a computer screen or other monitor. Through transmission of network, the capturing image is transferred to a screen of a corresponding side.

However, the prior art camera is placed on the computer screen by the bottom thereof without any fixing device. Therefore, it is possible to fall down due to carelessness and thus, it is inconvenient.

SUMMARY OF THE INVENTION

Accordingly, the primary object of the present invention is to provide a camera positioning seat for capturing an image and then displaying the image on a display device. By a positioning seat of the present invention, the camera can be fixed to the display device. No collision occurs.

Another object of the present invention is to provide a camera positioning seat, in which the structure of the positioning seat has a simple structure and can be assembled and detached convenient. Moreover, the engaging direction of the positioning seat 10 can be changed as desired so as to change the arrangement of the camera.

One feature of the present invention is that a camera positioning seat includes a connecting device, an hook, and a position device. The connecting device has a connecting piece. One surface of the connecting piece has an embedding piece, a rear surface of the camera being installed with a buckling groove with respect to a position of the embedding piece. An elastic hook is installed at one lateral side of another surface of the connecting piece/ The position device has a fixing box, and a sticky object is installed at one surface of the fixing box. Thereby, when the camera is to be fixed to the display device, the embedding piece of the connecting piece is embedded into the buckling groove at the rear side of the camera, and then the hook at another surface of the connecting device is hooked to the fixing box. Afterwards, by the sticky object of the fixing box is fixed to the display device and thus, the camera is fixed to the display device.

Another feature of the present invention is that an end of the hook without being connected to the connecting piece is installed with a buckling portion protruded outwards, and the lateral side of the fixing box is installed with a notch so that the buckling portion of the hook is protruded to the notch of the fixing box for hooking one lateral wall of the fixing box. Thus, the hook can not separate from the fixing box. As the hook is desired to separate from the fixing box, it is only necessary to push the buckling portion of the hook inwards so that the buckling portion of the hook is never hooked to the lateral wall of the fixing box, and meanwhile, pulling outwards the connecting device, the hook will separate from the fixing box.

The various objects and advantages of the present invention will be more readily understood from the following detailed description when read in conjunction with the appended drawing.

DETAILED DESCRIPTION OF THE PREFERRED EMBODIMENTS

Figure 1:
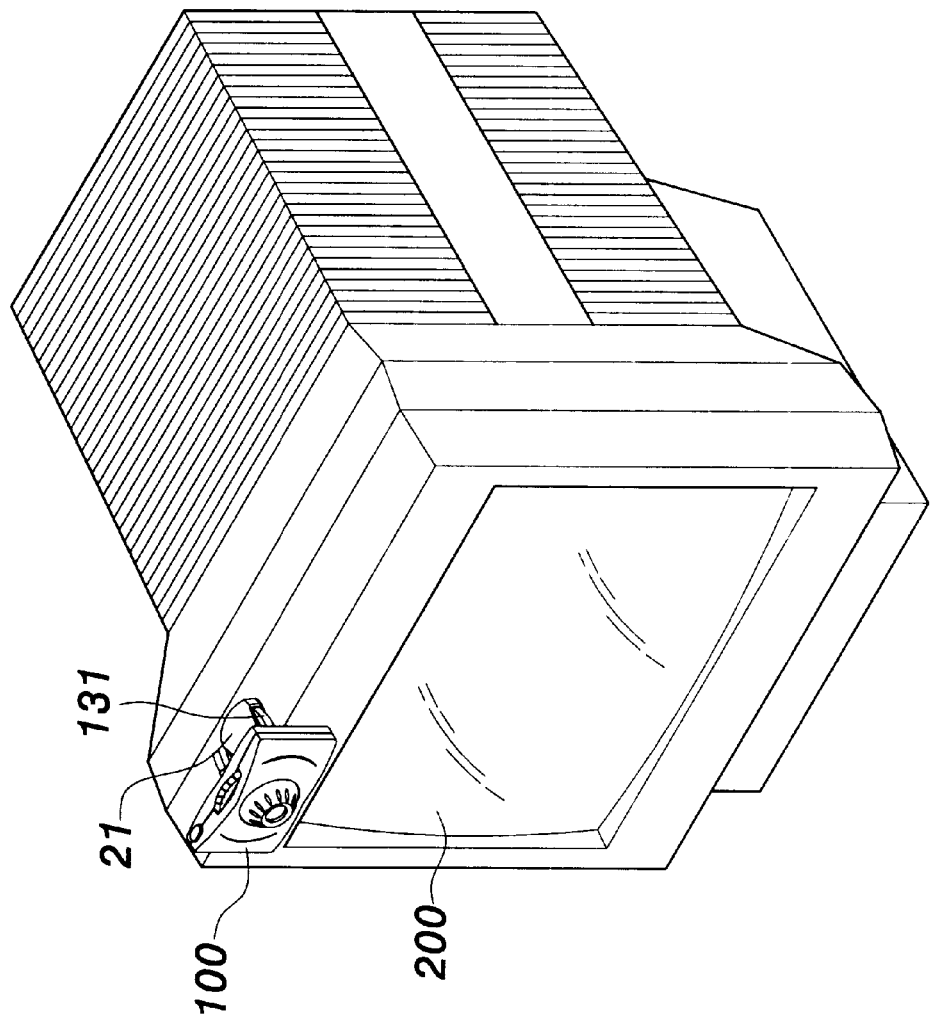
FIG. 1 is a schematic perspective view said that the present invention is fixed to a computer screen.
Figure 2:
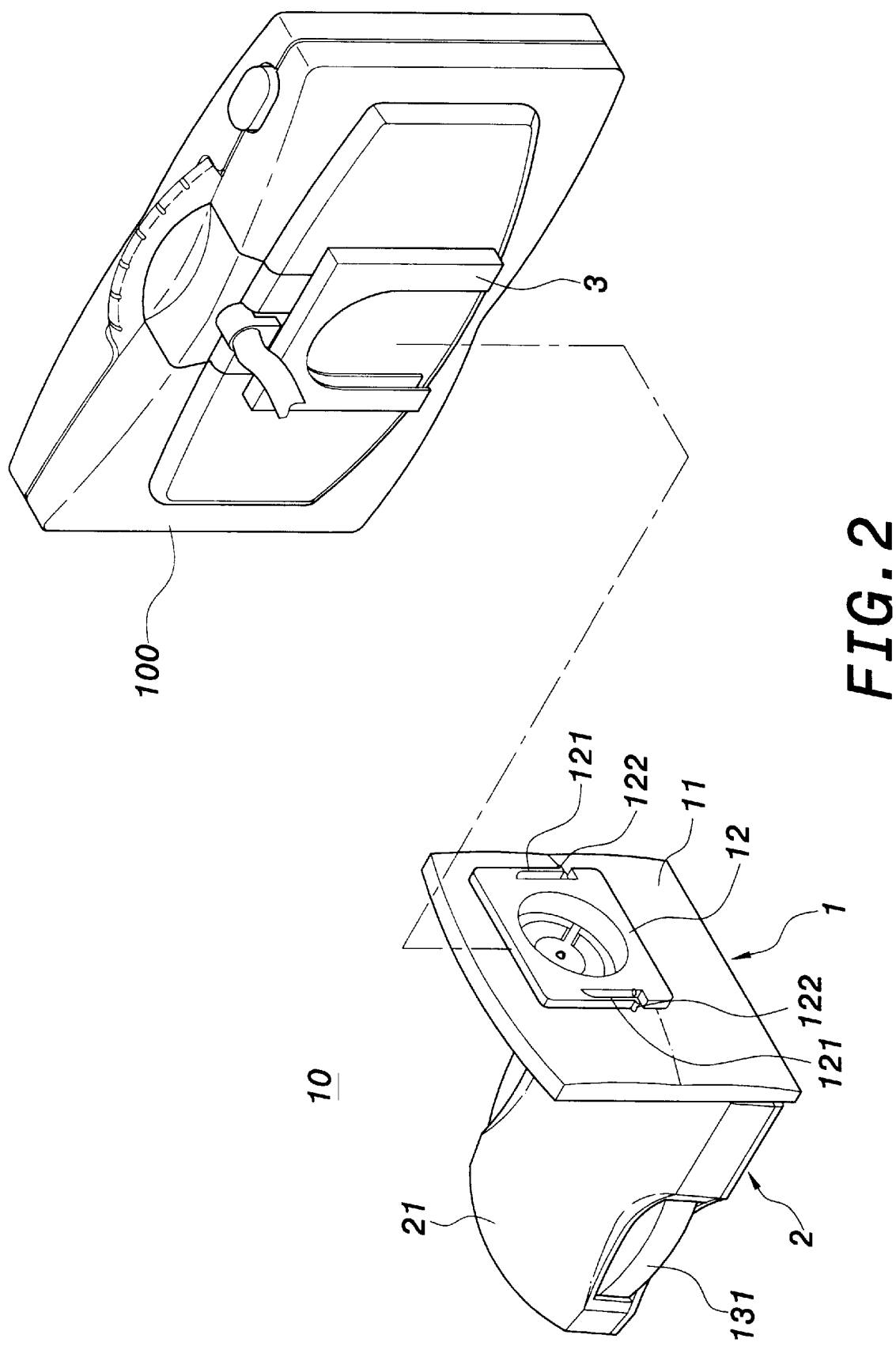
FIG. 2 is a schematic perspective view of the positioning seat and the camera of the present invention.

Referring to FIGS. 1 and 2, the camera positioning seat of the present invention is illustrated. The camera 100 serves to capture an image and then displays an image on a display device. The display device may be a computer screen 200. The positioning seat 10 includes a connecting device 1 and a position device 2. The connecting device 1 has a connecting piece 11. One surface of the connecting piece 11 is installed with an embedding piece 12 which is spaced with a distance with the connecting piece 11. Two lateral sides of the embedding piece 12 are installed with respective elastic arms 121. A free end of each elastic arm 121 has an outer lateral edge having a cambered protrusion 122, while the back surface of the camera 100 at a position with respect to the embedding piece 12 is installed with a matched buckling groove 3.

Figure 3:
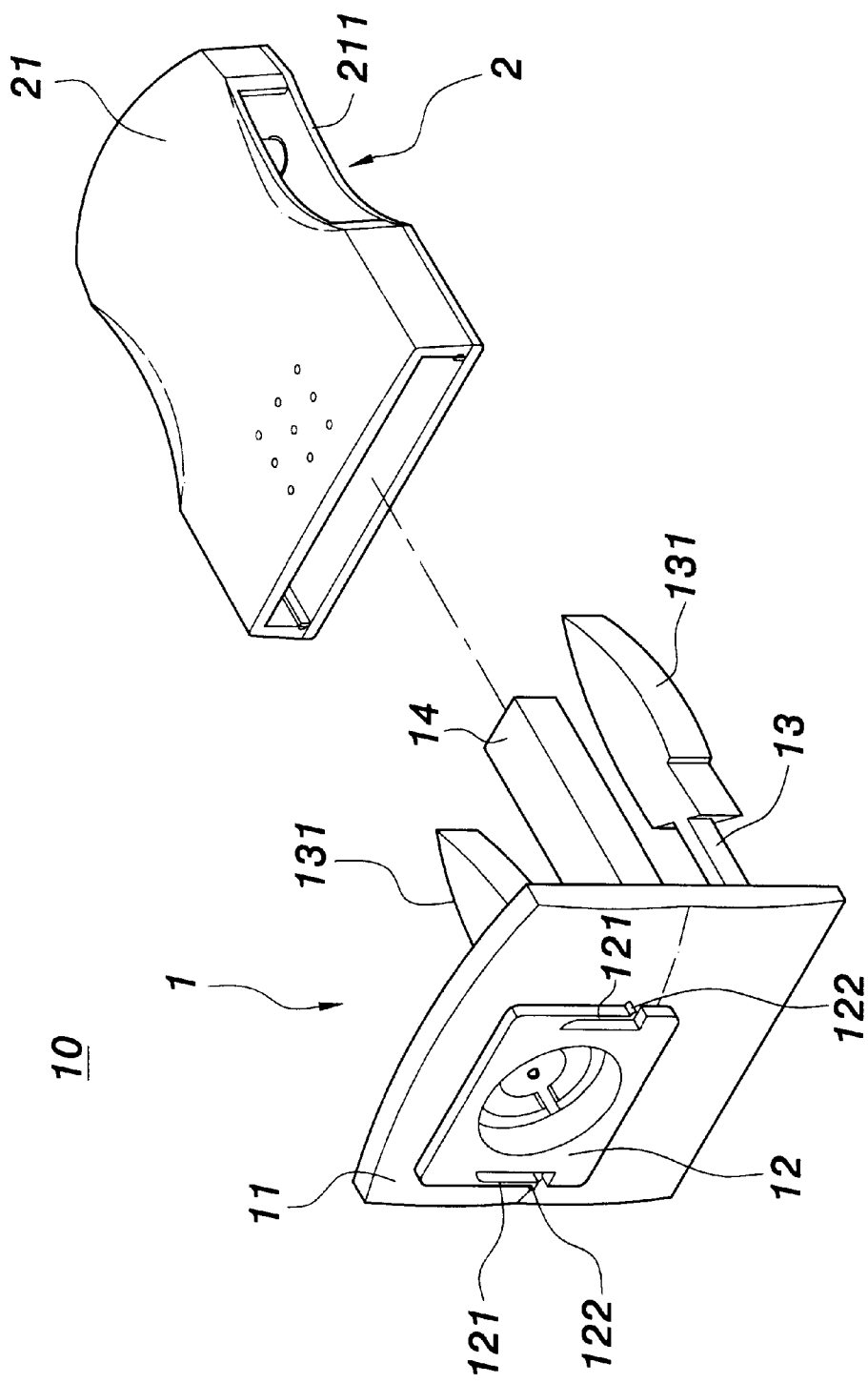
FIG. 3 is a schematic view showing the separated connecting device and fixing device of the present invention.

Referring to FIGS. 2 and 3, another surface of the connecting piece 11 has one lateral surface which is installed with an elastic hook 13. In this embodiment, each of the left and right sides of the connecting piece 1 is installed with a hook 13. At an end of the hook 13 without connecting to the connecting piece 1 is installed with an outwardly protruded buckling portion 131. The middle portion between the two hooks 13 are formed with an enhancing post 14. Furthermore, the position device 2 has a fixing box 21. The lateral side of the fixing box 21 is installed with a notch 211 so that the buckling portion 131 of the hook 13 can protrude into the notch 211 of the fixing box 21. Moreover, the fixing surface of the fixing box 21 is installed with sticky object (not shown). The sticky object is a sticky blanket or a buffer sponge strip with two glued surfaces. Of course, the computer screen 200 is also stuck with the sticky blanket or buffer sponge strip with two glued surfaces.

Figure 4:
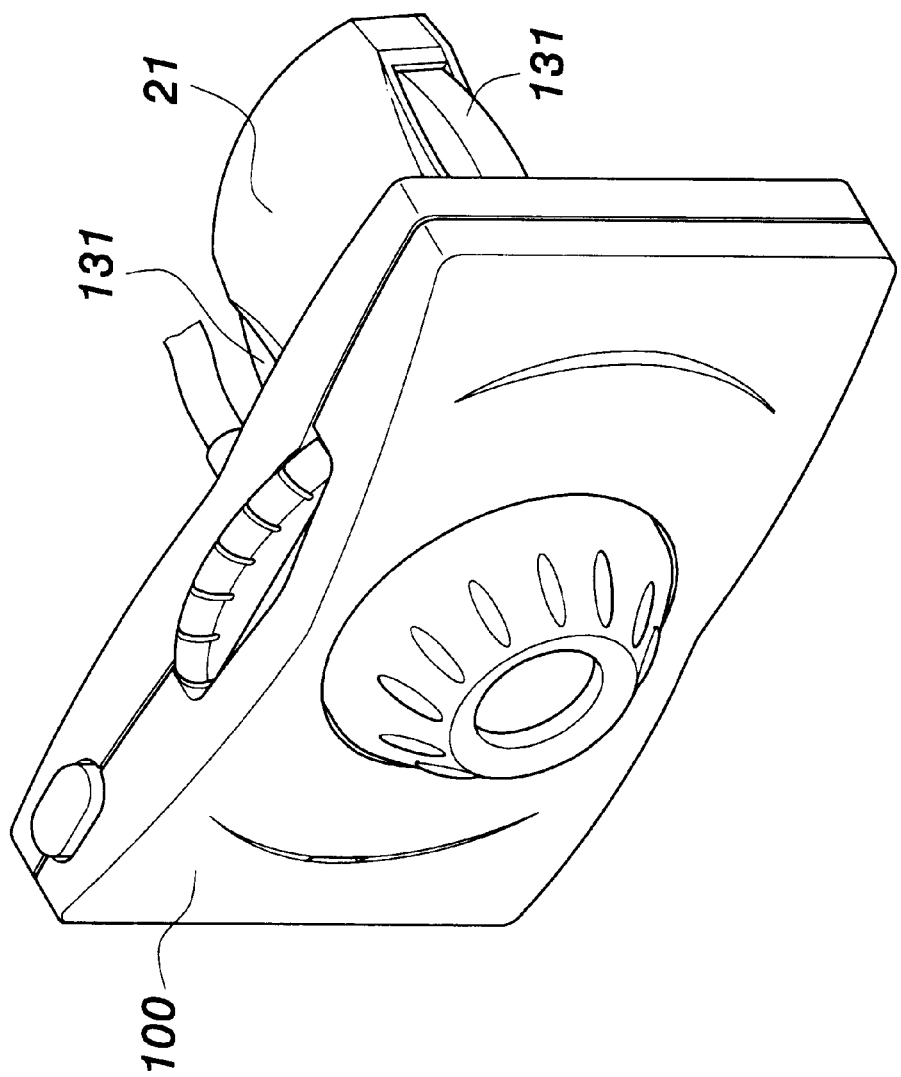
FIG. 4 is a schematic view showing the combined connecting device and fixing device of the present invention.

With reference to FIGS. 3 and 4, when it is desired to adhere the camera 100 to the computer screen 200, the embedding piece 12 on the connecting piece 1 can be at first embedded on the buckling groove 3 at the back side of the camera 100. Since the elastic arm 121 at each of the two sides of the embedding piece 12 will eject against the buckling groove 3 by the elastic force thereof so that the embedding piece 12 must apply a certain force in order that the cambered protrusion 122 of the embedding piece 12 may slide in the buckling groove 3, and then is separated from the buckling groove 3.

Afterward, the hook 13 at another surface of the connecting piece 11 is buckled in the fixing box 21. When the buckling groove 3 is buckled in the fixing box 21, the buckling portion 131 of the hook 13 will protrude to the notch 211 of the fixing box 21 for hooking the lateral wall of the fixing box 21, and thus, the hook 13 can not release from the fixing box 21. On the contrary, when the hook 13 is to be released from the fixing box 21, it is only needed to push the buckling portion 131 of the hook 13 inwards while pulling the connecting piece 11 outwards, thus, the hook 13 will separate from the fixing box 21. Finally, by adhering the sticky blanket of the computer screen 200, the camera 100 will be fixed to the camera 100, as shown in the figures.

Figure 5:
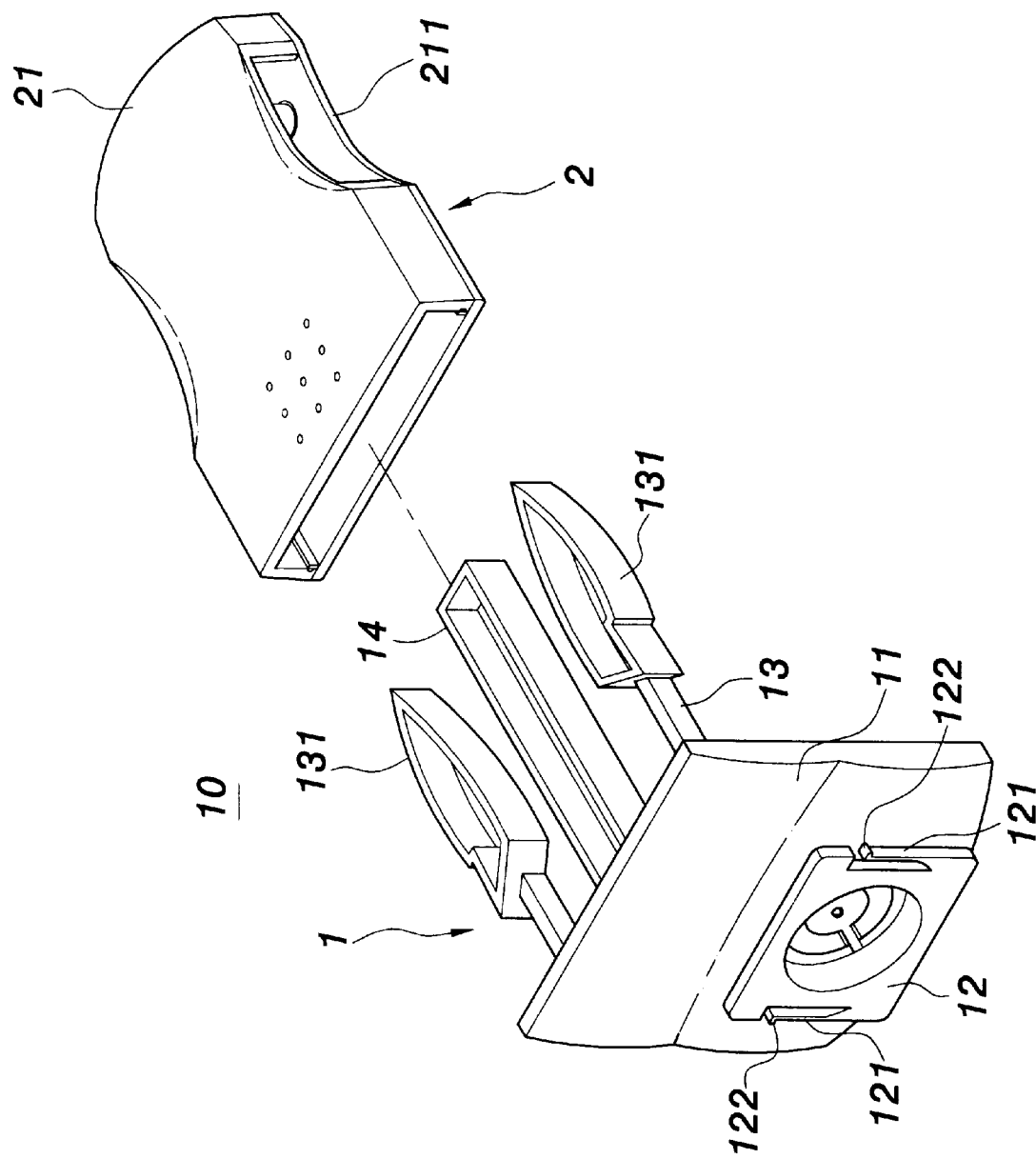
FIG. 5 is a schematic view showing the separated connecting device and fixing device in another embodiment of the present invention.
Figure 6:
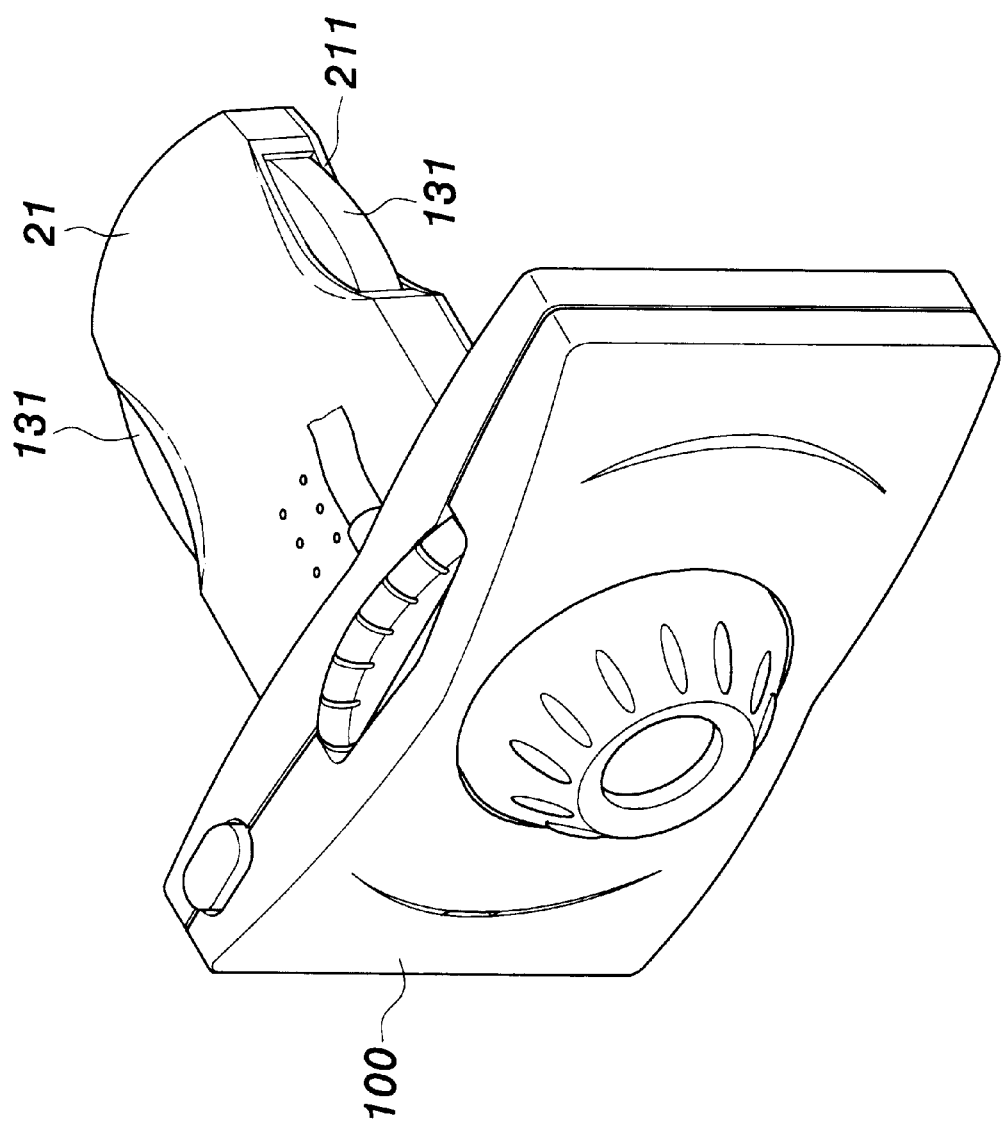
FIG. 6 is a schematic view showing the combined connecting device and fixing device in another embodiment of the present invention.
Figure 7:
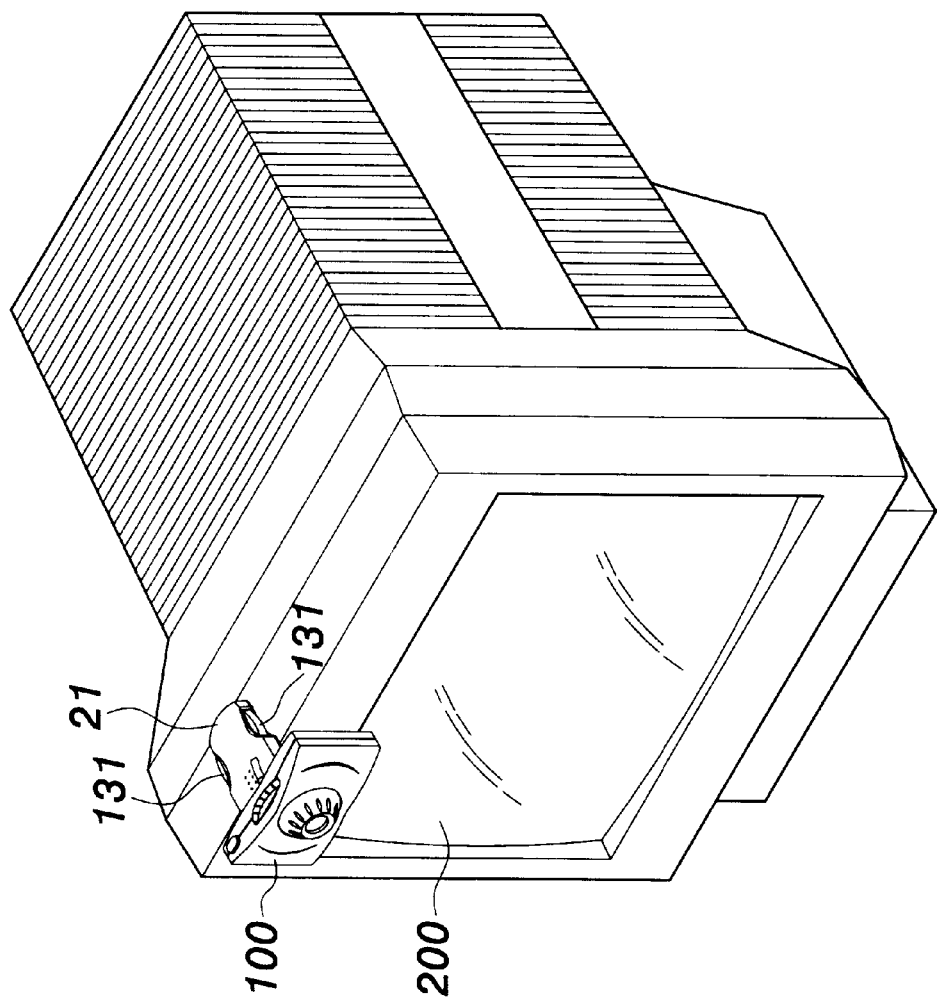
FIG. 7 is a schematic perspective view show that the present invention is fixed to a computer screen in another embodiment of the present invention.

In the present invention, since the hook 13 is installed at one lateral side of the connecting piece 11, therefore, in the optimum embodiment of the present invention as that illustrated in FIG. 3, the connecting device 1 has an L shape so that the hook 13 is placed therebelow. Therefore, the camera 100 is wholly located above the computer screen 200. Referring to FIGS. 5 and 6, another embodiment of the present invention is illustrated therein. When it is desired to change the installation of the camera 100, the connecting device 1 is changed with an angle of 180 degrees so that the connecting device 1 has a shape of "⌈". When the camera 100 is placed on the computer screen 200, the fixing box 21 will adhere on the upper side of the computer screen 200, while the camera 100 is in front of the computer screen 200, as shown in FIG. 7.

In summary, by the positioning seat 10 of the present invention, the camera 100 may be fixed at a proper place of the display device. No collision occurs. Furthermore, by fixing in front of a computer screen 200, the camera can be placed more closely to the user so as to have a preferred orientation for capturing an image. In the present invention, the structure of the positioning seat has a simple structure and can be assembled and detached convenient. Moreover, the engaging direction of the positioning seat 10 can be changed as desired so as to change the arrangement of the camera, and thus a preferred angle for capturing an image is acquired.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A camera positioning seat including:

a connecting device having a connecting piece;

a first surface of the connecting piece having an embedding piece;

a rear surface of a camera being installed with a buckling groove for coupling with the embedding piece;

at least one elastic hook being laterally installed on a second surface of the connecting piece;

a position device having a fixing box; and a sticky object being installed on a first surface of the fixing box;

wherein the camera is fixed to a display device by inserting the embedding piece of the connecting piece into the buckling groove at the rear surface of the camera, inserting the at least one hook at the second surface of the connecting device into the fixing box and affixing the sticky object of the fixing box to the display device.

2. The camera positioning seat as recited in claim 1, wherein the display device is a computer screen.

3. The camera positioning seat as recited in claim 1, wherein each of two lateral sides of the embedding piece is formed with an elastic arm, wherein an outer edge of a free end of the elastic arm has a cambered protrusion.

4. The camera positioning seat as recited in claim 1, wherein a free end of the at least one hook has an outwardly protruding buckling portion formed thereon, and a corresponding side of the fixing box is installed with a notch so that the buckling portion of the at least one hook protrudes through the notch of the fixing box.

5. The camera positioning seat as recited in claim 1, wherein an enhancing post is formed on the second surface of the connecting piece, wherein the enhancing post is centrally located between two of the at least one hooks.

6. The camera positioning seat as recited in claim 1, wherein the sticky object is a sticky blanket or a sponge tape glued at two surfaces.

* * * * *